Jan. 1, 1935.  R. S. SANFORD  1,986,605
TESTING APPARATUS FOR AEROPLANES
Filed April 29, 1933   4 Sheets-Sheet 3
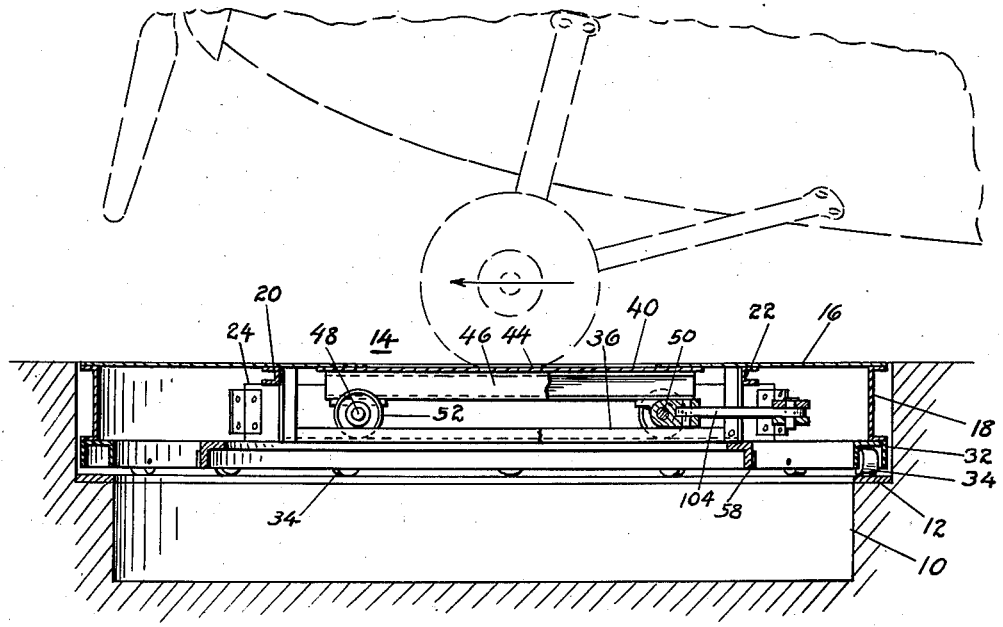
Fig. 4
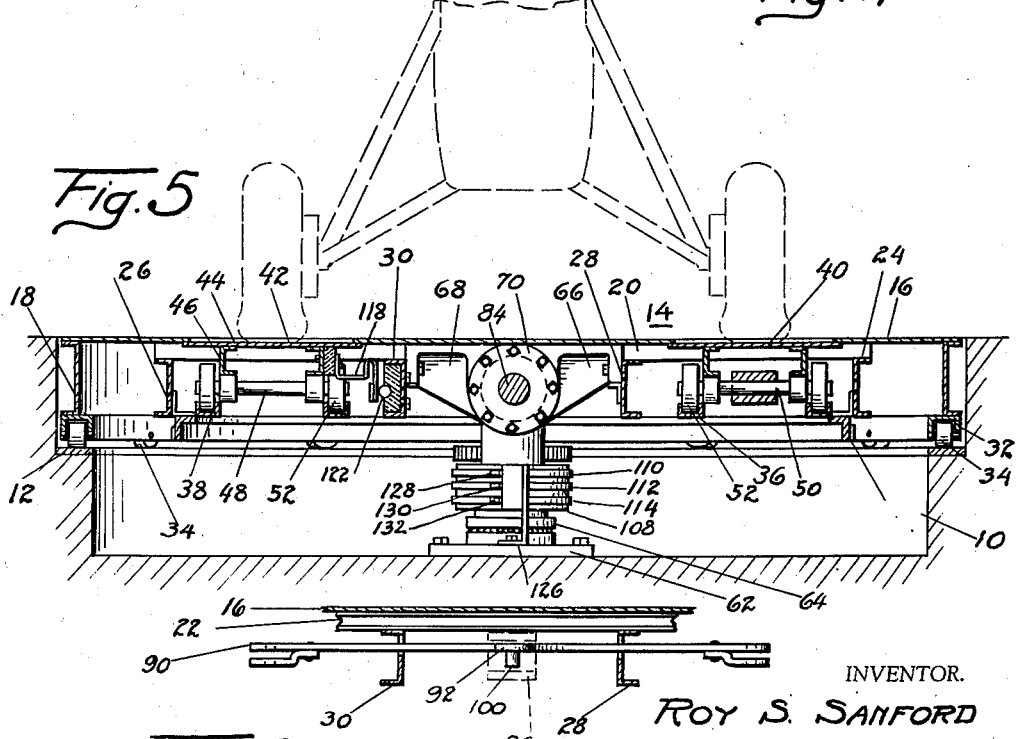
Fig. 5
Fig. 6
INVENTOR.
ROY S. SANFORD
BY
ATTORNEY.

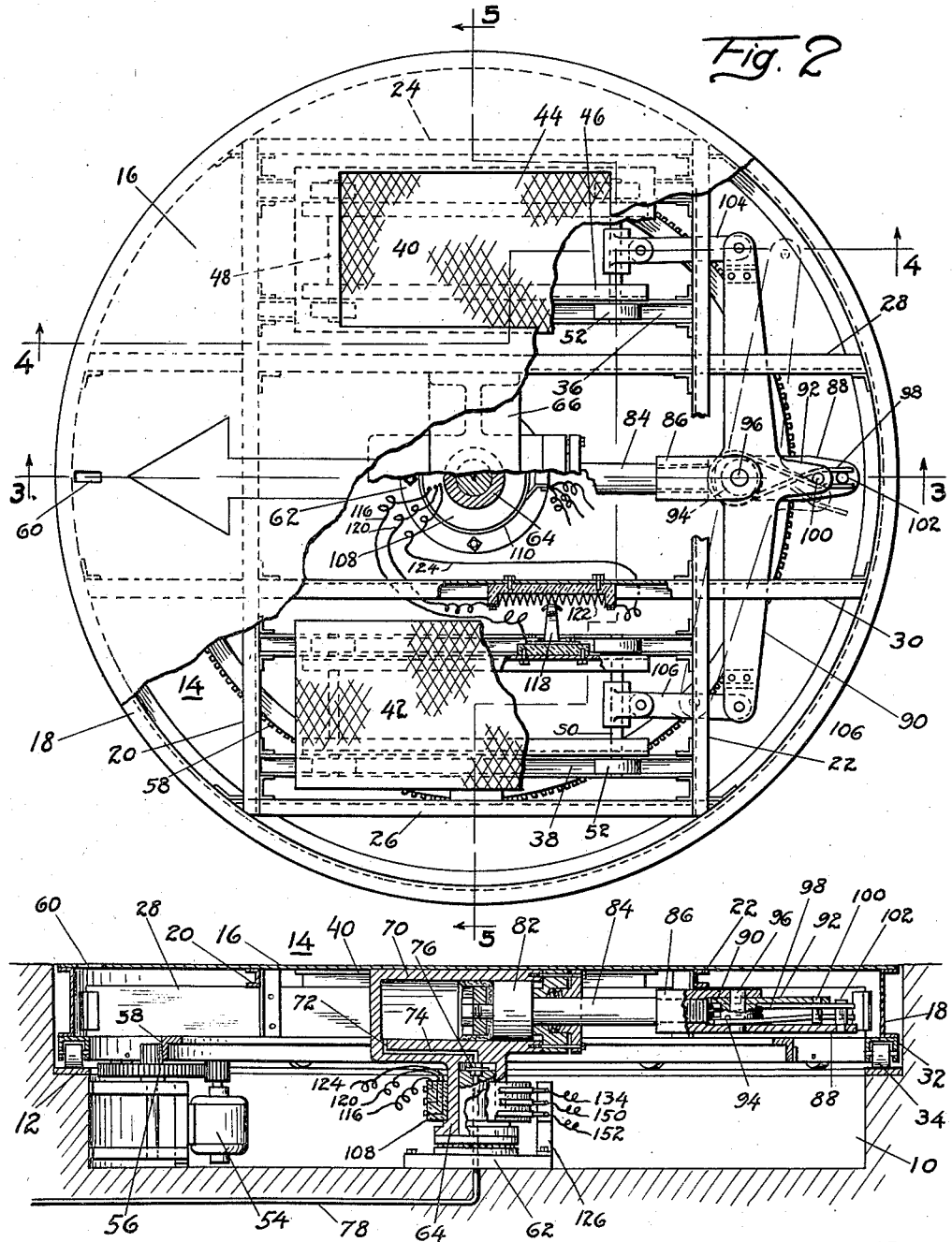

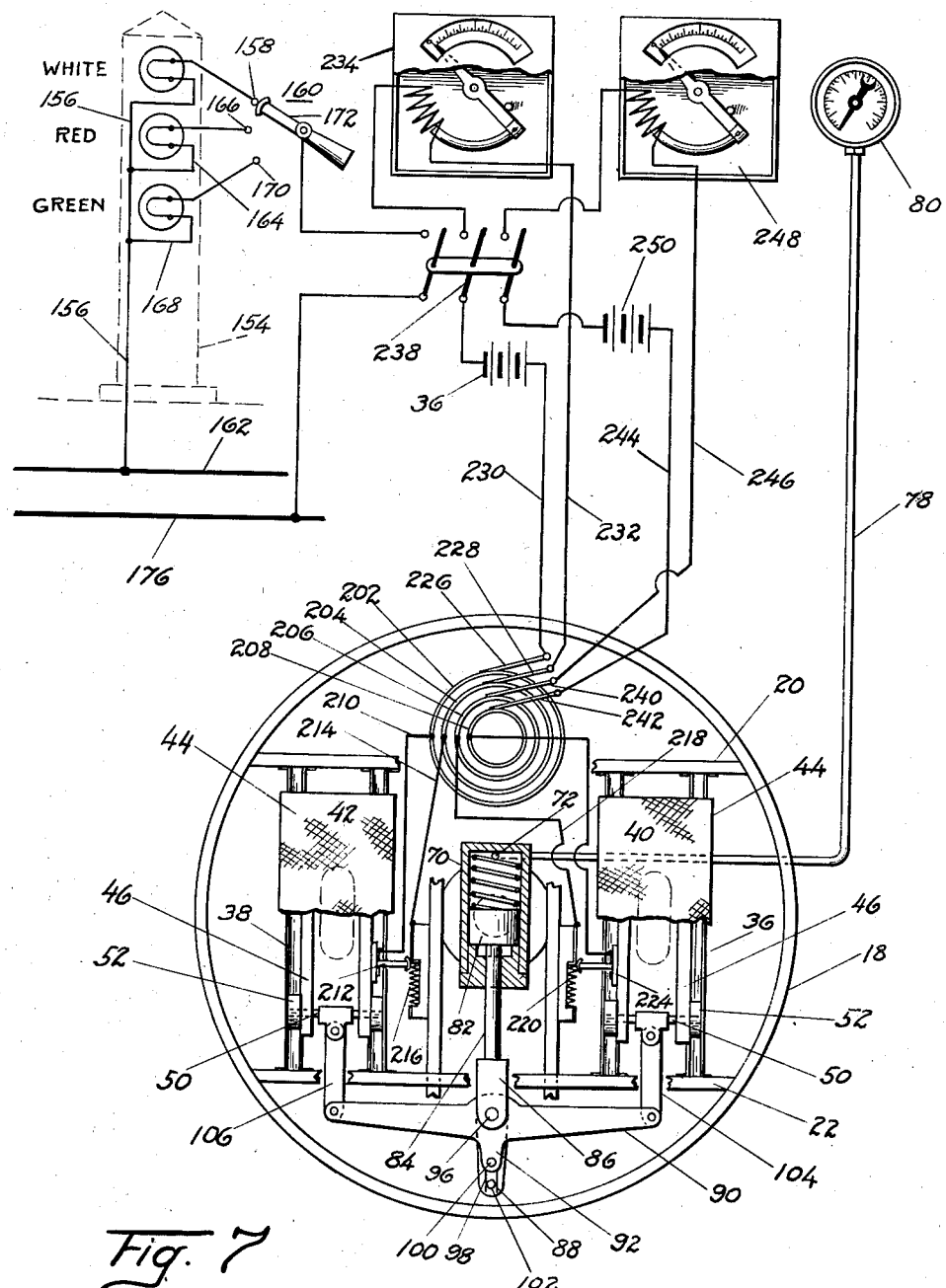

Patented Jan. 1, 1935

1,986,605

UNITED STATES PATENT OFFICE 1,986,605

TESTING APPARATUS FOR AEROPLANES

Roy S. Sanford, South Bend, Ind., assignor to Bendix-Cowdrey Brake Tester, Inc., South Bend, Ind., a corporation of Delaware Application April 29, 1933, Serial No. 668,637

5 Claims. (Cl. 73—51)

This invention relates to service apparatus, and more particularly to service apparatus for aeroplanes.

Broadly the invention comprehends an apparatus for testing the efficiency of the engine, the propeller, and the brakes associated with the wheels of an aeroplane.

In the illustrated embodiment of the invention a turn-table has thereon spaced movable carriages arranged to support the wheels on the landing gear of an aeroplane. The carriages are suitably connected to an equalizing bar pivotally attached to the rod of a piston. The piston is positioned for reciprocation in a cylinder pivotally mounted in the axis of the turn-table, and connected by a pipe line or conduit to a pressure indicating device. One of the carriages is connected in an electrical circuit including a variable resistance and an instrument for indicating variations in the resistance, and associated with this circuit is another circuit including a plurality of signal devices.

An object of the invention is to provide an apparatus for testing aeroplanes preparatory to flight.

Another object of the invention is to provide an apparatus for testing the efficiency of the brakes associated with the wheels on the landing gear of an aeroplane, the efficiency of the power plant, and the efficiency of the propeller, and to conduct these tests simultaneously.

An additional object is to provide a testing apparatus of this character which is simple and inexpensive in structure, highly efficient in use, positive in action, durable in service, and a general improvement in the art.

Other objects and advantages of the invention will more fully appear from the following description taken in connection with the accompanying drawings which illustrate one embodiment of the invention, and in which:—

Figure 2 is a top plan view of the turn-table partly broken away to better illustrate the cooperative parts.

Figure 3 is a sectional view substantially on line 3—3, Figure 2.

Figure 4 is a sectional view substantially on line 4—4, Figure 2,

Figure 5 is a sectional view substantially on line 5—5, Figure 2, and

Figure 6 is a detail view of the equalizing bar.

Figure 7 is a diagrammatic illustration of the modified form of the invention.

Figure 1:
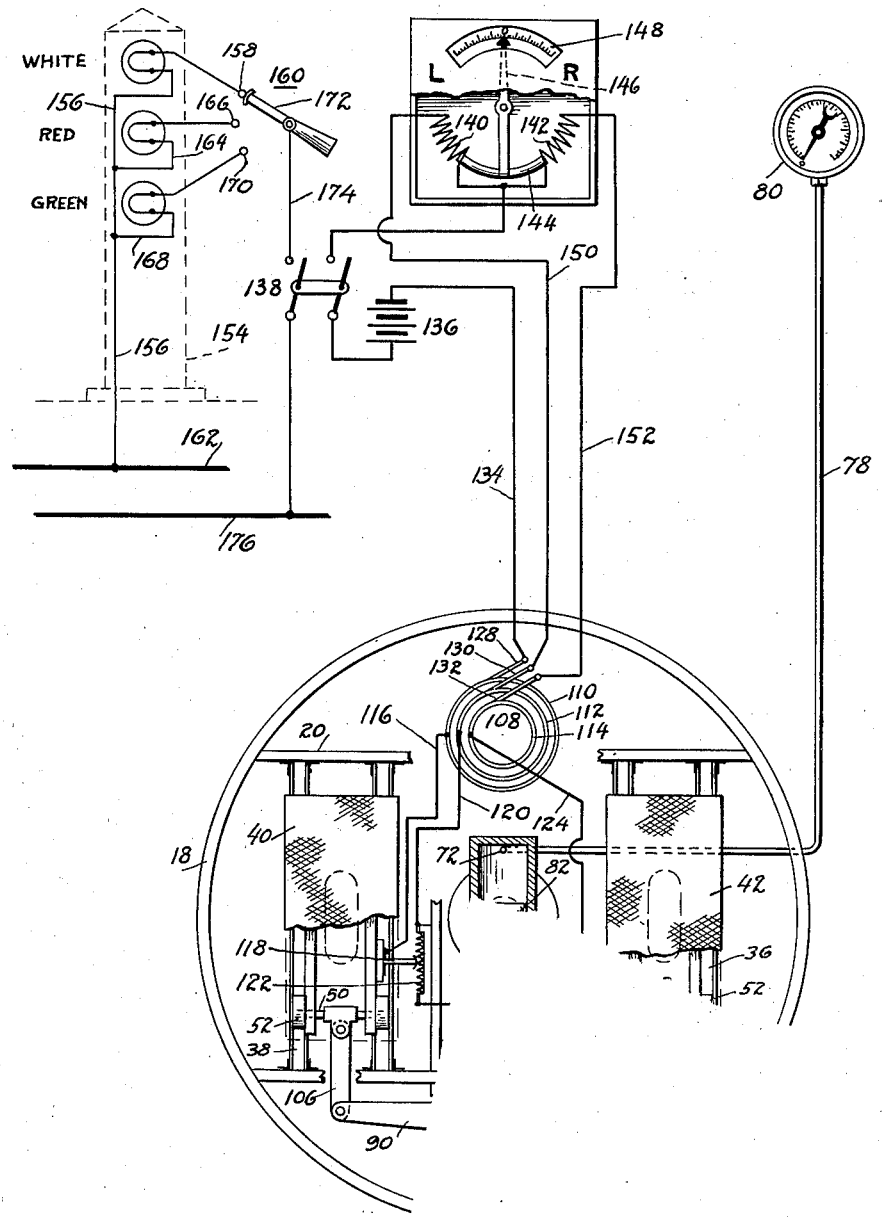
Figure 1 is a diagrammatical illustration of a testing apparatus embodying the invention.

Referring to the drawings for more specific details of the invention, 10 represents a pit, the wall of which has a ledge supporting an annular track 12. A turn-table indicated generally at 14 is positioned for rotation on the track 12. Preferably, the top of the turn-table is flush with a runway or the earth surrounding the pit.

The turn-table includes a platform 16 supported by a frame including a rim 18, parallel beams 20 and 22 having their respective ends suitably secured to the rim, beams 24 and 26 connecting the respective ends of the parallel beams, and spaced cross-beams 28 and 30 also suitably secured to the rim. As shown, the rim has secured thereto a circular channel member 32 carrying spaced rollers 34 adapted to travel on the track 12.

The beams 20 and 22 support corresponding parallel tracks 36 and 38. Corresponding carriages 40 and 42 are movable on the tracks. The carriages are arranged beneath spaced openings in the top of the turn-table. Each carriage includes a platform 44 suitably secured to a frame 46 supported by a pair of axles 48 and 50 having thereon rollers 52 adapted to travel on the tracks 36 or 38.

The turn-table may be rotated by a motor 54 suitably mounted in the pit and connected through reduction gearing 56 to a ring gear 58 secured to the frame supporting the table. If preferred, this may be dispensed with and the table manually rotated as by a lever or hook fitted in a slot 60 in the top of the table.

A base 62 positioned centrally in the pit and suitably secured to the bottom thereof supports for rotation a column 64 having lateral projections 66 and 68 secured respectively to the cross-beams 28 and 30. The column has formed integral therewith or suitably attached thereto a cylinder 70 having a port 72 connected by a duct 74 to a rotative gland 76 positioned in the axis of the column 64, the rotative gland being connected as by a pipe line or conduit 78 to a remotely positioned pressure gauge 80.

The cylinder 70 has therein a reciprocable piston 82 having a rod 84 extending through a packing gland in the head of the cylinder. The rod 84 has threaded thereon a sleeve 86 having an extended portion 88. The sleeve 86 is bifurcated for the reception of an equalizing bar 90. This bar has a centrally disposed lateral projection 92 and a bearing 94 for the reception of a pintle 96 by which the equalizing bar is pivoted to the sleeve 86.

A spring 98 is wound on the bearing 94. The free ends of this spring straddle a pin 100 on the lateral projection 92 of the equalizing bar and a pin 102 on the extended portion 88 on the sleeve 86. The spring serves to return the equalizing bar to its normal position. The respective ends of the bar are connected to the respective carriages 40 and 42 by links 104 and 106, the links being pivotally connected to the equalizing bar, and to sleeves on the axles 50 of the carriages.

The column 64 has thereon an insulated sleeve 108 on which are arranged a plurality of collector rings 110, 112 and 114. The ring 110 is connected by a lead 116 to a contactor arm 118 suitably mounted on the frame of the carriage 42, the ring 112 is connected by a lead 120 to one terminal of a resistance 122 suitably mounted on the frame and arranged for cooperation with the contactor arm 118, and the ring 114 is connected by a lead 124 to the other terminal of the resistance.

Positioned on the base 62 is a bracket 126 providing a support for a plurality of brushes 128, 130 and 132 engaging the collector rings 110, 112 and 114, respectively. The brush 128 is connected by a lead 134 to one terminal of a battery 136, the other terminal of which is connected through a double switch 138 to a post located centrally between the sections 140 and 142 of a sectionalized coil constituting a part of a solenoid, the core 144 of which is arcuate and depends from a pointer 146 cooperating with a dial 148. The brush 130 is connected by a lead 150 to coil 140 and the brush 132 is connected by a lead 152 to the coil.

A panel 154 has arranged thereon three lamps designated White, Red and Green, respectively. The lamp designated White is interposed in a lead 156 connecting a contact 158 of a three-way switch designated generally as 160 to a supply line 162. The lamp designated Red is connected in a branch lead 164 tapped off of the lead 156 and connected to a contact 166 of the three-way switch, and the lamp designated Green is connected in a branch lead 168 tapped off of the lead 156 and connected to the contact 170 of the three-way switch. The contactor 172 of the three-way switch is connected by a lead line 174 through the double switch 138 to a supply line 176.

In the modified form of the invention the column 64 has therein an insulating sleeve on which is arranged four collector rings 202, 204, 206 and 208. The collector ring 202 is connected by a lead 210 to a contactor arm 212 suitaby mounted on the frame of the carriage 42, and collector ring 204 is connected by a lead 214 to one terminal of a resistance 216 suitably mounted on the frame of the turn-table and arranged for cooperation with the contact arm 212.

The collector ring 206 is connected by a lead 218 to one terminal of the resistance 220 suitably mounted on the frame of the turn-table, and the collector ring 208 is connected by a lead 222 to a contactor arm 224 suitably mounted on the frame of the carriage 40 for cooperation with the resistance 220.

The collector rings 202 and 204 are connected through brushes 226 and 228 and leads 230 and 232 to an indicating instrument 234. The lead 230 has connected therewith a battery 236 and a three-blade switch 238. The collector rings 206 and 208 are connected through brushes 240 and 242 and leads 244 and 246 to an indicating instrument 248, and the lead 244 has connected therewith a battery 250 and the three-blade switch 238. In this form of the invention the three-blade switch 238 is a substitute for the two-blade switch illustrated in the preferred embodiment of the invention.

In operation, the double switch 138 is thrown to close the circuits and thereby supply current to both the indicating and signalling devices, and the contactor 172 is moved to engage the contact 158 to close that portion of the signal circuit including the signal device indicating White.

An aeroplane is then moved onto the platform under its own power in the direction indicated by the arrow shown in Figure 2, and positioned with the wheels on the landing gear of the plane resting on the carriages 40 and 42. With the plane in this position the platform is rotated to head the plane into the wind.

The pilot then applies the brakes associated with the wheels, and speeds up the motors of the plane to a predetermined speed proportional to the velocity of the prevailing wind. Due to the frictional engagement of the wheels with the carriages 40 and 42 and resistance to rotation of the wheels effected by the brakes, the plane moves forward carrying with it the carriages 40 and 42. This movement of the carriages displaces fluid or liquid in the cylinder 70 through the conduit 78 to the pressure gauge 80, thus giving a visual indication of the pull of the plane, and simultaneously therewith the effectiveness of the brakes is indicated by the travel of the wheels on the carriages and the individual effectiveness of the brakes is reflected by the dial 148.

When the brakes are not sufficiently effective to secure the wheels against rotation, the plane will move off of the carriages and hence no indication will be given on the pressure indicator 80. When the brakes are not equalized, or should one brake fail, the right brake for instance, the left wheel will grip the carriage 40 and will move this carriage forward until it abuts the beam 20, while the right wheel turns upon its axle as the carriage 42 moves backward. During this movement of the carriages 40 and 42 the equalizing bar 90 rocks on its pivot without imposing sufficient force to actuate the piston 82 and displace the fluid in the cylinder, and hence the pressure indicator 80 will register zero.

As the carriage 40 moves forward the variable resistance 122 is actuated to decrease resistance in the coil 140 and to increase resistance in the coil 142. This causes the armature coil 144 to rotate and to move the pointer 146 over the face of the dial 148 to the right, thus indicating that the brake associated with the right wheel requires adjustment.

Should the brake associated with the left wheel require adjustment, or fail to perform its proper function, the right wheel will grip the carriage 42 and move this carriage forward until it abuts the beam 20, while the left wheel turns on its axle and the carriage 40 moves backward. During this movement of the carriage, the equalizing bar 90 merely rocks on its pivot and does not apply perceptible force to the piston 82, and thus the pressure indicator is not affected.

As the carriage 42 moves forward, the variable resistance 122 is actuated to decrease the resistance in coil 142 and to increase the resistance in coil 140, resulting in rotation of armature coil 144 to move the pointer 146 to the left, thus indicating that the brake associated with the left wheel requires adjustment.

When each of the carriages 40 and 42 are connected in a circuit including a variable resistance, a battery, and an indicating instrument, as in the modified form of the invention, the pull of the plane is indicated on the pressure indicator 80 and the effectiveness of the individual brakes is indicated on the indicating instruments 234 and 238.

When the brakes are equalized, or substantially equalized, and are applied with sufficient force to secure the wheels against rotation or nearly so, the pull of the plane will be indicated on the dial of the pressure indicator 80. When the pull of the plane is insufficient, the starter or mechanic in charge shifts the contactor 172 to engage the contact 166 to flash the red signal as a warning to the pilot that he should not take off.

Insufficient pull of the plane may be due either to the pitch of the propeller blades or to engine trouble. These may be readily located and proper adjustments made, after which the pilot again speeds up the motors, and, assuming that at this time the pressure indicator 80 registers the proper pull, the starter or mechanic moves the contactor 172 to engage the contact 170 to flash the green signal as an indication to the pilot to take off.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:—

1. A testing apparatus comprising a rotatable platform, means for rotating the platform, spaced supports movable on the platform adaptable for frictionally engaging the wheels of an aeroplane, an equalizing bar connecting the supports, a compression device connected to the equalizing bar, a pressure gauge connected to the compression device for indicating the force transmitted from the supports to the equalizing bar, and separate means for measuring individual movements of the movable supports readily comparable for ascertaining relative movement of the supports.

2. A testing apparatus comprising a rotatable platform, means for rotating the platform, spaced supports movable on the platform adaptable for frictionally engaging the wheels of an aeroplane with their associated brakes applied, an equalizing bar connecting the supports, a compression device connected to the equalizing bar, a pressure gauge connected to the compression device for indicating the force transmitted from the wheel supports to the equalizing bar, and means for separately measuring the movements of the supports readily comparable for ascertaining the relative movement of the supports.

3. A testing apparatus comprising a rotatable platform, means for rotating the platform, spaced supports movable on the platform, a cylinder mounted in the axis of the platform, a piston movable therein, an equalizing bar pivotally connected to the rod of the piston and connecting the movable supports, a pressure indicating instrument connected to the cylinder for indicating the force transmitted from the supports to the equalizing bar, and means for indicating relative movement of the supports.

4. A testing apparatus comprising a rotatable platform, means for rotating the platform, spaced wheel supports movable on the platform adaptable for frictionally engaging the wheels of an aeroplane, a cylinder mounted in the axis of the platform, a piston movable therein, an equalizing bar pivoted to the rod of the piston and connecting the movable supports, a pressure indicating instrument connected to the cylinder for indicating the force transmitted from the supports to the equalizing bar, an electrical circuit including a resistance mounted on the rotatable platform, a contactor arm on one of the movable supports for cooperation with the resistance and an indicating instrument to measure the relative movement of the platforms.

5. A testing apparatus comprising a rotatable platform, an axial support for the platform, power driven means for rotating the platform, spaced movable supports on the platform, a cylinder on the axial support, a piston movable in the cylinder, an equalizing bar pivotally connected to the piston and connecting the supports, a pressure indicating instrument connected to the cylinder for indicating force transmitted from the supports to the equalizing bar, and corresponding electrical circuits each including a resistance mounted on the platform, a contactor arm carried by one of the movable supports, measuring means in said circuits to measure change in said resistance thereby indicating relative movement of the movable supports.

ROY S. SANFORD.